United States Patent [19]

Sakaemura

[11] Patent Number: 5,353,953
[45] Date of Patent: Oct. 11, 1994

[54] SEALED METER ASSEMBLY SUCH AS FOR A SPEEDOMETER, TACHOMETER, ODOMETER OR THE LIKE

[75] Inventor: Masafumi Sakaemura, Mori, Japan

[73] Assignee: Moriyama Kogyo Kabushiki Kaisha, Mori, Japan

[21] Appl. No.: 54,298

[22] Filed: Apr. 30, 1993

[51] Int. Cl.$^5$ ............................................. B65D 13/02
[52] U.S. Cl. .................................. 220/602; 220/662; 220/664; 220/612
[58] Field of Search ............... 248/27.1; 277/180, 189; 220/602, 662, 664, 663, 611, 612, 359, 669

[56] References Cited

U.S. PATENT DOCUMENTS

| | | | |
|---|---|---|---|
| 1,748,852 | 2/1930 | Smith | 220/602 |
| 2,085,277 | 6/1937 | Smith | 220/602 |
| 2,691,461 | 10/1954 | Kebbon | 220/664 |
| 3,088,627 | 5/1963 | Saunders | 220/662 |
| 4,832,349 | 5/1989 | Kawai et al. | 220/614 |
| 5,186,474 | 2/1993 | Jacobs | 277/180 |

FOREIGN PATENT DOCUMENTS 632178  1/1962  Italy ................................ 220/612

*Primary Examiner*—S. Castellano
*Attorney, Agent, or Firm*—Bacon & Thomas

[57] ABSTRACT

A sealed display device comprises a case for encasing a meter such as a speedometer, tachometer, odometer and the like, viewable through a display window or opening formed in the case, with a transparent cover sealed over the opening. The case has an annular lip surrounding the opening and adapted to receive a peripheral edge of the transparent cover. A layer of sealant is placed between the lip and the cover to seal the cover to the case. A plurality of spaced support members support the cover in spaced relationship to the lip so that a sufficiently thick layer of sealant may be placed between the cover and the lip to prevent breakage of the seal due to differences in thermal expansion and contraction between the case and cover. Angled areas may be milled from the case in surrounding relationship to the lip to define areas for accommodating a thicker layer of sealant than could otherwise be accommodated.

4 Claims, 4 Drawing Sheets

SEALED METER ASSEMBLY SUCH AS FOR A SPEEDOMETER, TACHOMETER, ODOMETER OR THE LIKE

FIELD OF THE INVENTION

This invention relates to sealed display devices such as used on automobiles, motorcycles, and the like.

BACKGROUND OF THE INVENTION

Motorcycles, for example, are equipped with sealed meters or display devices such as tachometers, speedometers, odometers and trip odometers. These meters are sealed by a transparent member such as transparent glass or resin serving to keep water and dirt from getting inside the unit. FIG. 7 shows a seal configuration of this type of display window. Transparent member 103 is set via sealant material 104 into the lip 102 which is formed in the display window unit 101 of the case 100.

In the above-described unit, the transparent member 103 is tightly sealed in the display window 101 around the lip 102 of the display window 101 by means of sealant 104. However, because the assembly of these units requires that the edge of the transparent member 103 be positioned on the top surface of the lip 102 and that it be coated with sealant, it is impossible to use a sufficiently thick layer of sealant 104 and at the same time accurately position the transparent member 103 with respect to the lip.

Accordingly, when the sealed display device is exposed to heat, the differences in the thermal expansion coefficients between the case 100 and the transparent member 103 can cause the seal of the sealant 104 to be broken between the upper surface of the lip 102 and the transparent member 103.

It would be possible to resolve this problem of seal breakage by increasing the thickness of the sealant, but since this would involve broadening the gap between the transparent member and the lip, this would make positioning during assembly all the more difficult and detract from assembly productivity.

There is thus need for a means for covering the opening of an instrument such as a speedometer, tachometer and the like with a transparent member so that the transparent member is sealed to the housing of the instrument with a sufficiently thick layer of sealant to maintain a seal over a prolonged period of time, and which also facilitates production of the sealed unit.

DISCLOSURE OF THE INVENTION

The present invention was developed after consideration of the foregoing problem, and its primary object is to provide a sealed display device which prevents breakage of the seal while at the same time permitting good productivity.

In order to resolve the foregoing problems, the present invention provides a sealed display device in which a transparent cover is sealed in place over a display window or opening to cover the display area of an encased meter, in which a lip surrounds the opening to receive a marginal edge of the transparent cover, and spaced support members on the lip engage the transparent cover to space it from the lip when the cover is set into place via sealant between the cover and the lip.

The use of support members between the top surface of the lip of the display window case and the transparent member allows the transparent member to "float" above the lip. This arrangement assures sufficient thickness of the sealant which seals between the upper surface of the lip and the transparent member. Seal reliability is improved because even if the device is subjected to heat, the differences in the coefficients of thermal expansion between the case and the transparent member do not cause the seal to separate. Also, when applying the sealant, the position of the transparent member with respect to the lip is indexed by the support members for the transparent member.

BRIEF DESCRIPTION OF THE DRAWINGS

The foregoing, as well as other objects and advantages of the invention, will be apparent from the following detailed description when considered in conjunction with the accompanying drawings, wherein like reference characters designate like parts throughout the several views, and wherein.

BEST MODE OF CARRYING OUT THE INVENTION

Figure 1:
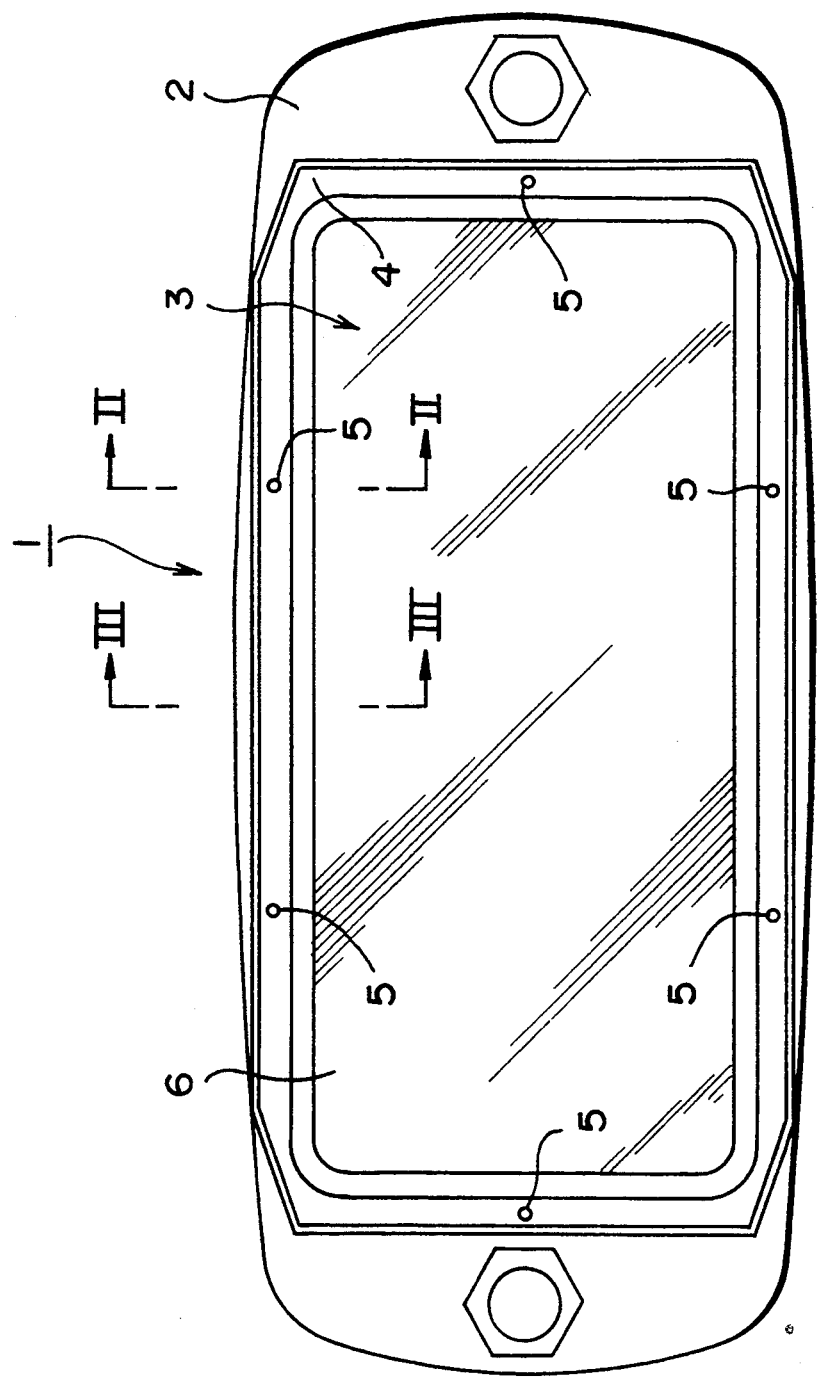
FIG. 1 is a top plan view of a sealed display device according to the invention.

Referring more particularly to the drawings, one embodiment of the invention is depicted generally at 1 in FIGS. 1–5. The sealed display device 1 comprises a case 2 made from a material such as synthetic resin, and having a rectangular display window area 3. An instrument, not shown, such as a tachometer, speedometer, odometer or tip odometer would be displayed through the window 3.

A lip 4 is molded in the display window area, along with support or indexing pillars 5, two on each of the sides of the rectangular window area. The indexing pillars are preferably formed integrally with the case during the molding process. In addition, there is an upper sloped or angled area 4a above the lip 4, and a lower angled area 4b below the lip, which were formed by milling around the perimeter of the display window area between the face of the case and an outer vertical wall section 4c, and between an inner diameter of the lip and an inner vertical wall section 4d.

A transparent member or cover 6 made of transparent glass or synthetic resin, for example, is received in the lip 4 of the display window area 3. During assembly, the transparent member 6 is set atop supports 5, which indexes the position of the transparent member 6 with respect to the lip. Sealing material 7 between the transparent member and the lip seal the display window area 3. Silicone type resins may be used as the sealant material, and the resin may be applied so that it extends from the lower milled area 4b to the upper milled area 4a.

When the transparent member 6 is assembled to the lip 4 of the display window area 2 in the manner described above, the support pillars 5 index the position of the transparent member with respect to the lip so that the transparent member 6 is "floated" or spaced above the lip 4. This maintains a sufficiently wide gap between the transparent member and the lip to assure a sufficiently thick seal 7. Even if the case is subjected to heat, the seal 7 will not break due to differences between the the thermal expansion coefficients of the case 2 and the transparent member 6 because of the improved seal thus obtained.

In addition, by establishing the angled milled areas 4*a* and 4*b* above and below the lip, respectively, increased seal thickness can be maintained between the transparent member 6 and the case 2.

Further, since the indexing of the transparent member 6 with respect to the lip 4 is accomplished by means of setting the former atop the supports 5, the operational efficiency of the assembly operation is considerably improved. Even if some sealant 7 gets between the top of the support pillars 5 and the transparent member 6, there will be little effect and this will cause but small loss to the operational efficiency when compared to the case of not using the supports.

Figure 2:
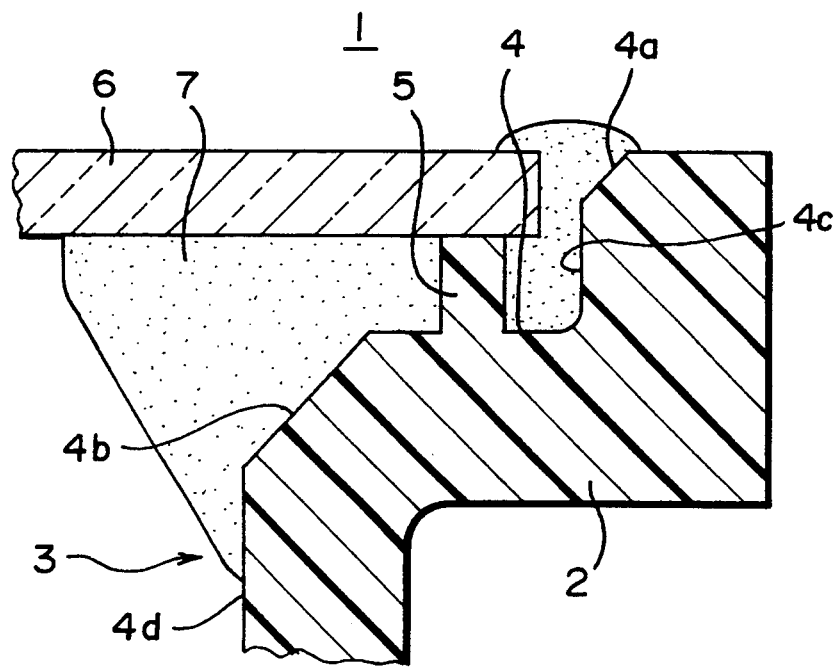
FIG. 2 is an enlarged, transverse view in section taken along line II—II in FIG. 1.
Figure 3:
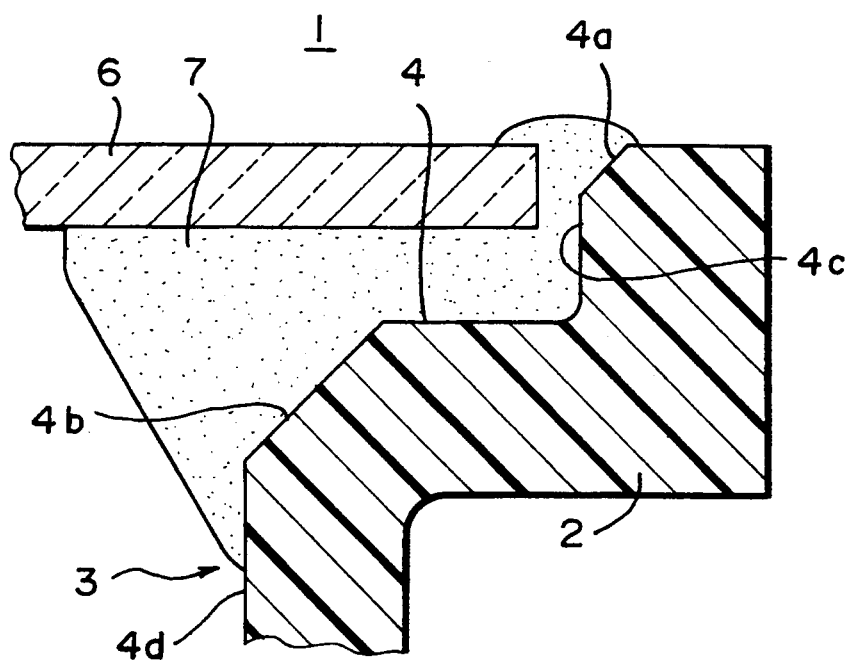
FIG. 3 is an enlarged, transverse view in section taken along line III—III in FIG. 1.
Figure 4:
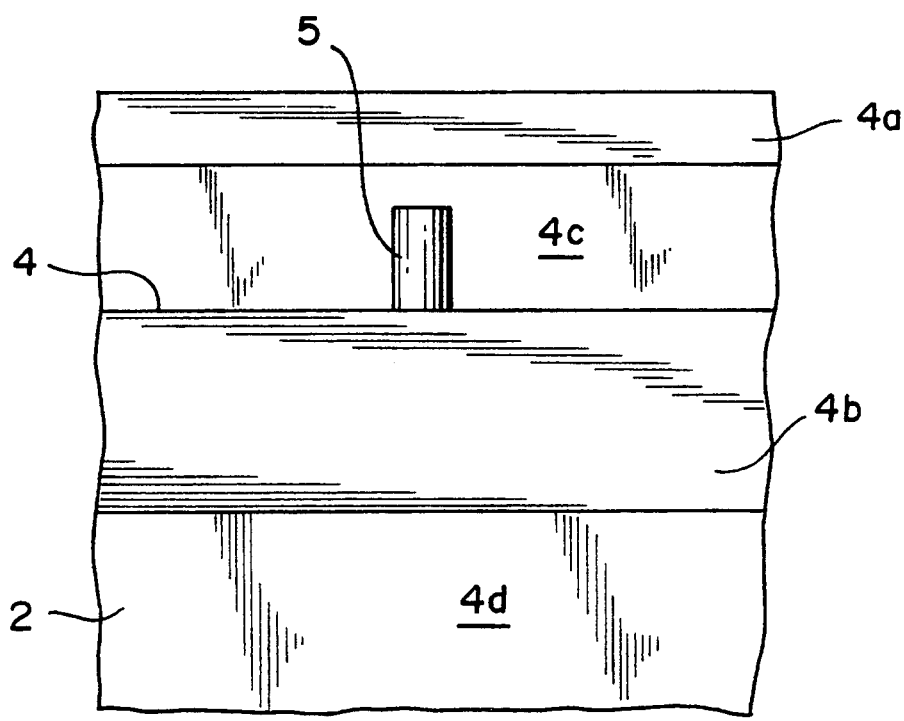
FIG. 4 is an enlarged, fragmentary view in front elevation of a portion of the lip of the display window area of the case.
Figure 5:
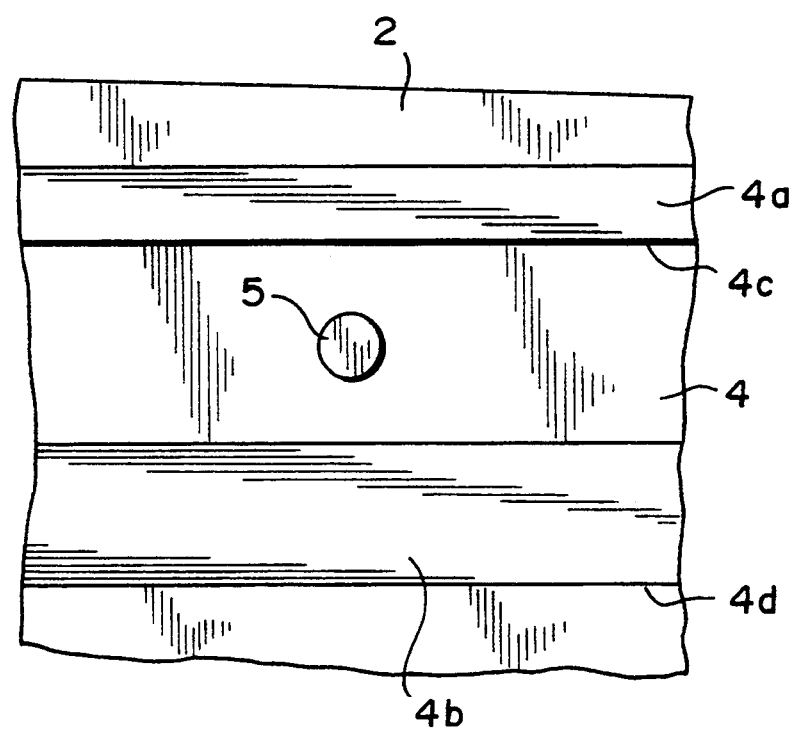
FIG. 5 is an enlarged, fragmentary view in top plan view of a portion of the lip of the display window area of the case.
Figure 6:
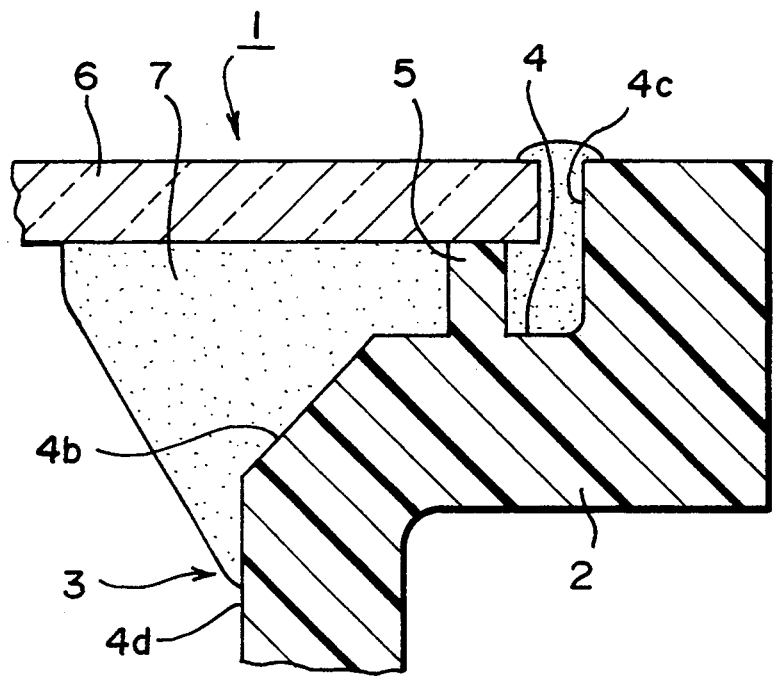
FIG. 6 is a view similar to FIG. 2 of a modified sealed display device.
Figure 7:
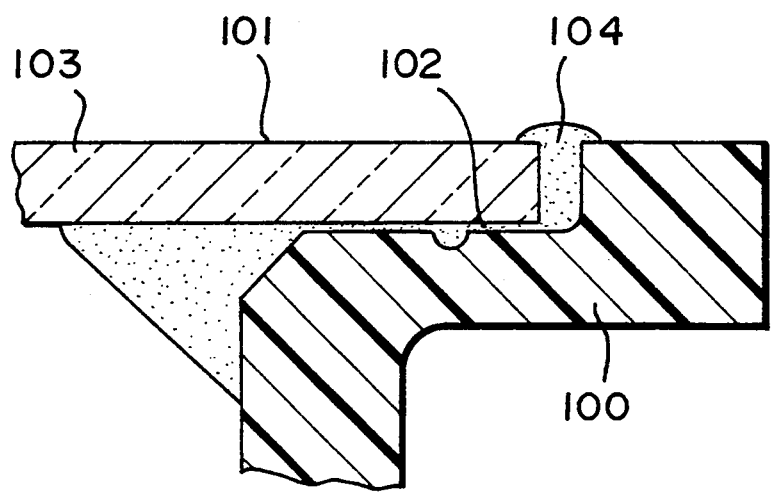
FIG. 7 is an enlarged, fragmentary, transverse sectional view of a portion of the lip, case and transparent cover of a prior art sealed display device.

FIG. 6 shows another embodiment of a sealed display device in a cross-sectional view in the same position as used in FIG. 2. In this embodiment, there is a lower angled area 4*c* which has been milled away, but there is no upper angled area corresponding to area 4*a* in the previous embodiment. This embodiment prevents overexposure of the sealant on the exposed surface.

The support pillars 5 are shown in the drawings as integrally formed with the case, but instead they could be formed integrally with the transparent cover, or separate from either of these structures. Also, there is no need from them to be pillar shaped, and they may have any desired shape so long as they allow the transparent member to "float" above the lip and provide space for a substantial thickness of sealant between the case and the cover.

The invention therefore provides means to support a transparent instrument cover above a lip on the instrument case so that a sufficiently thick seal can be placed between the lip and the cover to prevent the seal from breaking due to differences in thermal coefficients between the case and the cover.

Moreover, since the position of the transparent member is indexed by resting atop the support pillars in spaced relation to the lip when the sealant coating is applied, productivity is increased due to the ease in accurately positioning the cover on the case.

While the invention has been shown and described in detail, it is to be understood that this invention is not to be considered as being limited to the exact form disclosed, and that changes in detail and construction may be made therein within the scope of the invention, without departing from the the spirit thereof.

What is claimed is:

1. A sealed display device comprising:
   a case for encasing a meter, said case having a display opening through which the meter may be viewed;
   a transparent cover sealed over said opening;
   said case having an annular lip surrounding said opening and receiving a peripheral edge of the transparent cover, the annular lip being recessed into a face of said case, defining a step between an outer vertical wall section and an inner vertical wall section;
   a sealant placed between the lip and the cover to seal the cover to the case with a sloped surface being formed between the outer wall section and the face of the case to provide for accommodating a thicker layer of said sealant between the cover and the case than could otherwise be accommodated; and
   support means supporting the cover in spaced relationship to the lip so that a sufficiently thick layer of said sealant extends between the cover and the lip to prevent breakage of the seal due to difference in thermal expansion and contraction between the case and cover, said support means including a plurality of spaced projections integral with said case and extending between the lip and a marginal edge of the cover.

2. A sealed display device as claimed in claim 1, wherein:
   an angled surface is formed between the lip and the inner vertical wall section to provide spaced for accommodating a thicker layer of said sealant between the transparent cover and the case than could otherwise be accommodated.

3. A sealed display device as claimed in claim 1, wherein:
   the projections are formed integrally with the case and extend generally perpendicularly from the lip toward the marginal edge of the cover.

4. A sealed display device as claimed in claim 1, wherein:
   the projections are formed integrally with the case and comprise short support pillars extending generally perpendicularly from the lip toward the marginal edge of the cover to support the cover in spaced relationship above the lip.

* * * * *